US010970497B2

(12) United States Patent
Caselli et al.

(10) Patent No.: US 10,970,497 B2
(45) Date of Patent: Apr. 6, 2021

(54) METHOD OF HARVESTING RADIO-FREQUENCY ENERGY, CORRESPONDING CIRCUIT AND DEVICE

(71) Applicant: STMicroelectronics S.r.l., Agrate Brianza (IT)

(72) Inventors: Michele Caselli, Reggio Emilia (IT); Andrea Boni, Reggio Emilia (IT); Marco Ronchi, Monza (IT)

(73) Assignee: STMICROELECTRONICS S.r.l., Agrafe Brianza (IT)

( * ) Notice: Subject to any disclaimer, the term of this patent is extended or adjusted under 35 U.S.C. 154(b) by 95 days.

(21) Appl. No.: 16/280,395

(22) Filed: Feb. 20, 2019

(65) Prior Publication Data

US 2019/0258833 A1 Aug. 22, 2019

(30) Foreign Application Priority Data

Feb. 21, 2018 (IT) .......................... 102018000002924

(51) Int. Cl.
*G06K 7/10* (2006.01)
*G06K 19/07* (2006.01)
*H02J 50/20* (2016.01)

(52) U.S. Cl.
CPC ..... *G06K 7/10148* (2013.01); *G06K 7/10158* (2013.01); *G06K 19/0709* (2013.01); *G06K 19/0726* (2013.01); *H02J 50/20* (2016.02)

(58) Field of Classification Search
CPC ..................... G06K 7/10148; G06K 7/10158
(Continued)

(56) References Cited

U.S. PATENT DOCUMENTS 7,167,090 B1   1/2007  Mandal et al.
10,187,773 B1 *  1/2019  Zalewski et al. ....... H04W 4/02
(Continued)

FOREIGN PATENT DOCUMENTS

WO    2007/066267 A2   6/2007
WO    2015/019106 A2   2/2015

OTHER PUBLICATIONS

Razavi, *RF Microelectronics*, Prentice Hall, Upper Saddle River, New Jersey, 1998, Chapter 2.5, "Passive Impedance Transformation," pp. 50-52 (6 pages).
(Continued)

*Primary Examiner* — Toan C Ly
(74) *Attorney, Agent, or Firm* — Seed IP Law Group LLP (57) ABSTRACT

A radiofrequency harvester circuit may be used in a batteryless RFID device. The harvester circuit includes an antenna unit that captures radiofrequency signals and harvesting circuitry coupled to the antenna unit for collecting energy from the radiofrequency signals captured by the antenna unit. The antenna unit is selectively tunable at a plurality of tuning bands that are scanned by selectively tuning the antenna unit at different frequency bands and sensing respective values indicative of the power of radiofrequency signals captured by the antenna unit at the frequency bands scanned. A highest value out of said respective values for the power of radiofrequency signals as well as the frequency band in the plurality of tuning bands of the antenna unit providing the aforesaid highest value are identified and the harvester circuit is operated with the antenna unit tuned at the frequency band providing the highest value thus identified.

19 Claims, 6 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 2006/0094425 | A1* | 5/2006 | Mickle et al. ............ | H04Q 7/20 |
| | | | | 455/434 |
| 2011/0248832 | A1 | 10/2011 | El Waffaoui et al. | |
| 2013/0337806 | A1* | 12/2013 | Barash et al. ......... | H04W 24/00 |
| | | | | 455/434 |
| 2016/0197508 | A1 | 7/2016 | Kruiskamp | |

OTHER PUBLICATIONS

Boni et al., "Multi-function ESD protection circuit for UHF RFID devices in CMOS technology," *Electronics Letters* 49(7):2013, 2 pages.

Caselli et al., "An Extended Temperature Range UHF RFID Front-end in CMOS 350 nm," 11th Conference on Ph.D. Research in Microelectronics and Electronics, Jun. 29-Jul. 2, 2015, Glasgow, United Kingdom, pp. 377-380.

Caselli et al., "Analysis and design of an integrated RF energy harvester for ultra low-power environments," *Int J Circ Theor Appl.* 47:1086-1104, 2019.

Facen et al., "CMOS power retriever for UHF RFID tags," *Electronics Letters* 43(25):2007, 2 pages.

Hsieh et al., "An RF Energy Harvester With 44.1% PCE at Input Available Power of -12 dBm," *IEEE Transactions on Circuits and Systems—I: Regular Papers* 62(6):1528-1537, 2015.

Michelon et al., "RF Energy Harvester with Sub-threshold Step-up Converter," IEEE International Conference on RFID, May 3-5, 2016, Orlando, Florida, 8 pages.

Ozaki et al., "Fully-Integrated High-Conversion-Ratio Dual-Output Voltage Boost Converter With MPPT for Low-Voltage Energy Harvesting," *IEEE Journal of Solid-State Circuits* 51(10):2398-2407, 2016.

Saini et al., "Efficient Power Management Circuit for RF Energy Harvesting with 74.27% Efficiency at 623nW Available Power," 14$^{th}$ IEEE International New Circuits and Systems Conference, Jun. 26-29, 2016, Vancouver BC, Canada, 4 pages.

Schillinger et al., "A 96.7% Efficient Boost Converter with a Stand-by Current of 420 nA for Energy Harvesting Applications," IEEE International Symposium on Circuits and Systems, May 22-25, 2016, Montreal, Canada, 4 pages.

Zhang et al., "A High-Efficiency DC-DC Boost Converter for a Miniaturized Microbial Fuel Cell," *IEEE Transactions on Power Electronics* 30(4):2041-2049, 2015.

Nakamoto et al., "A Passive UHF RF Identification CMOS Tag IC Using Ferroelectric RAM in 0.35-μm Technology," *IEEE Journal of Solid-State Circuits* 42(1): 101-110, Jan. 2007.

O'Driscoll et al., "A mm-Sized Implantable Power Receiver with Adaptive Link Compensation," IEEE International Solid-State Circuits Conference, Session 17, TD: Energy-Aware Sensor Systems, 17.5, 2009.

Pineula et al., "London RF Survey for Radiative Ambient RF Energy Harvesters and Efficient DC-load Inductive Power Transfer," 7$^{th}$ European Conference on Antennas and Propagation (EUCAP 2013)—Convened Sessions, pp. 2839-2843.

Stoopman et al., "A Self-Calibrating RF Energy Harvester generating 1V at -26.3 dBm," 2013 Symposium on VLSI Circuits Digest of Technical Papers, pp. C226-C227.

* cited by examiner

METHOD OF HARVESTING RADIO-FREQUENCY ENERGY, CORRESPONDING CIRCUIT AND DEVICE

BACKGROUND

Technical Field

The description relates to harvesting radio-frequency (RF) energy.

One or more embodiments may be applied, e.g., to Radio-Frequency IDentification (RFID) devices, e.g., with the capability of operating in extreme low-power consumption conditions.

Description of the Related Art

In its current applications, Radio-Frequency IDentification (hereinafter, briefly RFID) technology involves the use of electronic tags placed on objects, humans or animals with the capability of relaying identifying information to an electronic reader by means of radio-waves.

Automated toll payment systems or tracking systems capable of monitoring the progress of shipments, manufacturing processes and so on are exemplary of possible RFID applications.

A simple and cheap realization of an RFID tag may involve a miniaturized silicon device applied (e.g., glued) onto a laminar substrate with an antenna layout imprinted thereon.

The frequency response of the tag may vary depending on various factors.

For instance, the material of the substrate may reduce the capability to transfer information from the tag to a reader, so that certain tags may be successfully queried only at short range due to the electrical properties of the material on which they are applied.

Pursuing a more uniform and reliable coverage range may lead to designing RFID antennas with low quality factors (e.g., Q in the 5-to-10 range), which may give rise to wideband arrangements exhibiting low sensitivity to external effects at the expense of the communication range capabilities.

Conversely, higher quality factors (e.g., Q in the range of 30-50) provide the capability of extending the communication range between the RFID tag and a reader at the expense of a higher frequency selectivity and sensitivity to the environment (e.g., surrounding materials).

BRIEF SUMMARY

Despite the increased activity in that area, further improved solutions are desirable which may facilitate, e.g., further expanding the use of RFID technology.

One or more embodiments may be based on the recognition that an automatic self-tuning system facilitates avoiding undesired resonant frequency spreading associated with handling or removing reactive impedance in parallel with an antenna.

One or more embodiments may extend the communication coverage range between an RFID tag and a reader or, more generally, increase the energy which may be collected by a combination of an antenna and an associated RF rectifier (so-called "rectantenna" or "rectenna").

Consequently, while suited for use in connection with RFID technology, one or more embodiments may more generally facilitate designing autonomous smart sensors with complex capabilities, e.g., in sensing the environment and in providing data processing.

One or more embodiments may provide an energy-efficient solution for adjusting the self-resonance frequency of an antenna to available RF power sources (e.g., GSM, LTE, and so on) thus facilitating the use of (ultra) low-power analog sensors and memory storage elements and more generally the use of those devices where an increase in power available may lead to the number of functions available/provided being correspondingly increased.

One or more embodiments make it possible to develop "smart" RFID devices with long-range communication capability and efficient energy harvester capabilities.

One or more embodiments may involve using a high quality factor (Q) resonant antenna combined with an (ultra) low-power auto-tuning arrangement capable of tracking RF signals over the air in order to locate and exploit more/most powerful RF signals available for harvesting purposes over a certain portion of the RF spectrum (e.g., 800-900 MHz, this being otherwise a merely exemplary, non-limiting figure).

One or more embodiments may involve skipping certain frequencies and/or limiting the number of the frequencies involved in the tracking/checking process.

One or more embodiments may involve a reference clock source, a digital state machine logic circuitry and level shifters with the capability of reducing overall consumption to values below 100 nW.

One or more embodiments make it possible to provide battery-operated RFID devices adapted to be configured and kept notionally indefinitely (e.g., for periods in excess of ten years) with a certain antenna tuning configuration with virtually no losses with the exception of leakage effects.

In one or more embodiments, the antenna tuning range can be configured once or checked periodically.

With a pre-configured tuning setting, an antenna/RF rectifier combination ("rectenna") may be configured to harvest RF energy with high efficiency and the capability of supplying sensor circuitry without having to rely on a battery.

For instance, harvester devices can be devised having a high sensitivity with the capability of switching on at (very) low input power levels, e.g., below −30 dBm (decibel-milliwatts) or just a few μW.

One or more embodiments may provide harvesters capable of accumulating energy from a remote reader or from other sources such as Wi-Fi/LTE/GSM signals and store the energy collected in a storage element such as a capacitor, possibly (but not necessarily) in conjunction with a battery thus preserving the battery from undesired discharging.

One or more embodiments can be applied to battery-less RFID devices. In such an application the "rectenna" may wake up without a specific configuration and/or with limited sensitivity during a start-up phase (e.g., with a sensitivity range of −10 dBm/−15 dBm). This may be associated with an increased time to have an operative harvester voltage ($V_{HARV}$) with a higher input RF power to turn on the circuitry. Once a desired level for $V_{HARV}$ becomes available, an auto-tuning circuit may start tuning the antenna thus increasing the communication range, since the associated RF rectifier starts to operate in a fully efficient manner.

In one or more embodiments a DC-DC converter may be provided capable of accumulating energy into a storage element such as a capacitor for further use.

One or more embodiments thus facilitate accumulating energy "drop-by-drop" until a certain quantity becomes available which may permit activating loads such as, e.g., environment sensors (pressure, temperature, image sensors, and so on) and circuitry capable of processing/transmitting such information.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments are intended to address various issues likely to arise, e.g., in RFID (Radio-Frequency IDentification) devices, including devices of the battery-less type operating in continuous or discontinuous mode, as well as in a variety of devices, such as, e.g., Internet-of-Things (IoT) devices such as wireless sensor nodes.

These applications may benefit from low-power consumption as this facilitates achieving a long useful life (e.g., years) for batteries. Also, the capability of harvesting power from the environment may permit ultimately dispensing with batteries and providing battery-less devices.

Radio-frequency (RF) harvesters may include an AC/DC converter (RF rectifier) combined with a high efficiency DC-DC converter for transferring the energy from the rectifier output to a storage element such as a capacitor. The energy stored can be used to supply low-power circuits including, e.g., digital control units, various sensors to monitor temperature, pressure, humidity, and so on and circuits for transferring the related information, e.g., to a remote reader. As noted, in the case of RFID applications, the substrate onto which an RFID tag is applied can modify the characteristics of the antenna.

Energy available for RF harvesters is very limited (few μW or less). Since the RF energy is (extremely) low, an RF harvester being matched to the antenna will facilitate picking-up (all) the energy available and avoiding reflection issues.

The radio-frequency field available at a certain location is otherwise difficult to control and/or to predict in respect of various factors such as frequency allocation (that is the distribution over the RF spectrum), power intensity and presence at certain time.

One or more embodiments are based on the recognition that an auto-tuning capability in an energy-harvesting antenna may facilitate collecting in an efficient manner the radiofrequency energy available at a certain location/time.

For that purpose, one or more embodiments may involve scanning the radio-frequency spectrum available at a certain time at a certain location searching for a certain "channel" (or band) providing a highest available power, thus facilitating maximum power point tracking (MPPT) operation.

An antenna tuning capability facilitates implementing the combination of a high Q (narrow bandwidth) with an associated RF rectifier ("rectenna") thus increasing the voltage at the output of the rectifier circuit, which facilitates supplying associated circuits such as associated electronic circuits. Devices such as C-MOS devices adapted to be powered with a supply voltage higher than a threshold voltage $V_T$ are exemplary of such circuits.

For instance (the quantitative figures referred to throughout this description are merely exemplary and non-limiting), if the lowest RF power suitable to supply a dedicated low-power circuit such as a C-MOS circuit is in the range of −20 dBm (about 10 μW) over a specific frequency band, the RF harvester circuit should desirably be low-power by itself and be able to effectively collect even very low energy levels available without appreciable losses.

Tuning the antenna/rectifier arrangement to a frequency where a highest power is available at a certain point of space and time is found to effectively contribute to achieve the goals discussed in the foregoing.

Document U.S. Pat. No. 7,167,090 B1 discloses an analog auto-tuning circuit with a linear loop implementing a frequency variation strategy based on a slope detector which compares a current RF rectifier voltage with a previous configuration voltage stored in a dedicated capacitor. Two voltage amplitude values are obtained at different resonant frequencies and then compared to control a frequency tuning direction.

Such an arrangement requires a certain amount of energy to operate and ensure stability of the entire loop. Such a system in fact checks only the voltage amplitude at the RF rectifier output, looking for its maximum value over the scanned frequency band. It is worth noticing that if the rectifier is connected to a DC-DC converter working in the discontinuous mode as described in FIG. 3, the output voltage of the rectifier itself is kept almost constant. Therefore, maximizing the output voltage of the rectifier over the scanned frequency band with the rectifier not connected to any load does not guarantee that the achieved point corresponds to the maximum power that can be delivered by the rectifier when the DC-DC converter is connected to the rectifier. Furthermore, the power available at the output of the rectifier may not be enough to permit correct operation of a DC-DC converter to accumulate energy into a "tank" capacitor. In the presence of a low RF input power, the DC-DC converter could be undesirably turned on, which may result in an amount of energy drawn from the system which is higher than the amount of energy that the system may derive from the antenna.

As noted, the RF energy available at a certain point of space and time is largely uncontrollable and unpredictable. The solution disclosed in U.S. Pat. No. 7,167,090 B1 may thus be unable to operate effectively in such a context, especially in the presence of a spiky RF signal.

Documents such as O'Driscoll, et al.: "A mm-sized implantable power receiver with adaptive link compensation", ISSCC February 2009, pp. 294-295 disclose the possible use of a bank of capacitors in the place of a varactor for implementing a variable matching network, with an integrator replaced by an up/down counter or a digital circuit implementing a gradient-based search.

Somewhat similar arrangements are disclosed in Stoopman et al.: "A Self-Calibrating RF Energy Harvester generating 1V at −26.3 dBm", 2013 Symposium on VLSI Circuits Digest of Technical Papers, 18-2, pp. C226-C227.

It is otherwise noted (see, e.g., Pinuela, M., et al.: "London RF Survey for Radiative Ambient RF Energy Harvesters and Efficient DC-Load Inductive Power Transfer", 2013 7th European Conference on Antennas and Propagation (EuCAP) Gothenburg 2013, pp. 2839-2843) that the power spectrum available in a current environment (e.g., an urban environment) can be approximated as a multi-tone signal exhibiting a strong variability with respect to place and time with an expected available power in the range of −30 to −20 dBm (by assuming a value for Q of about 25-30).

Figure 1:
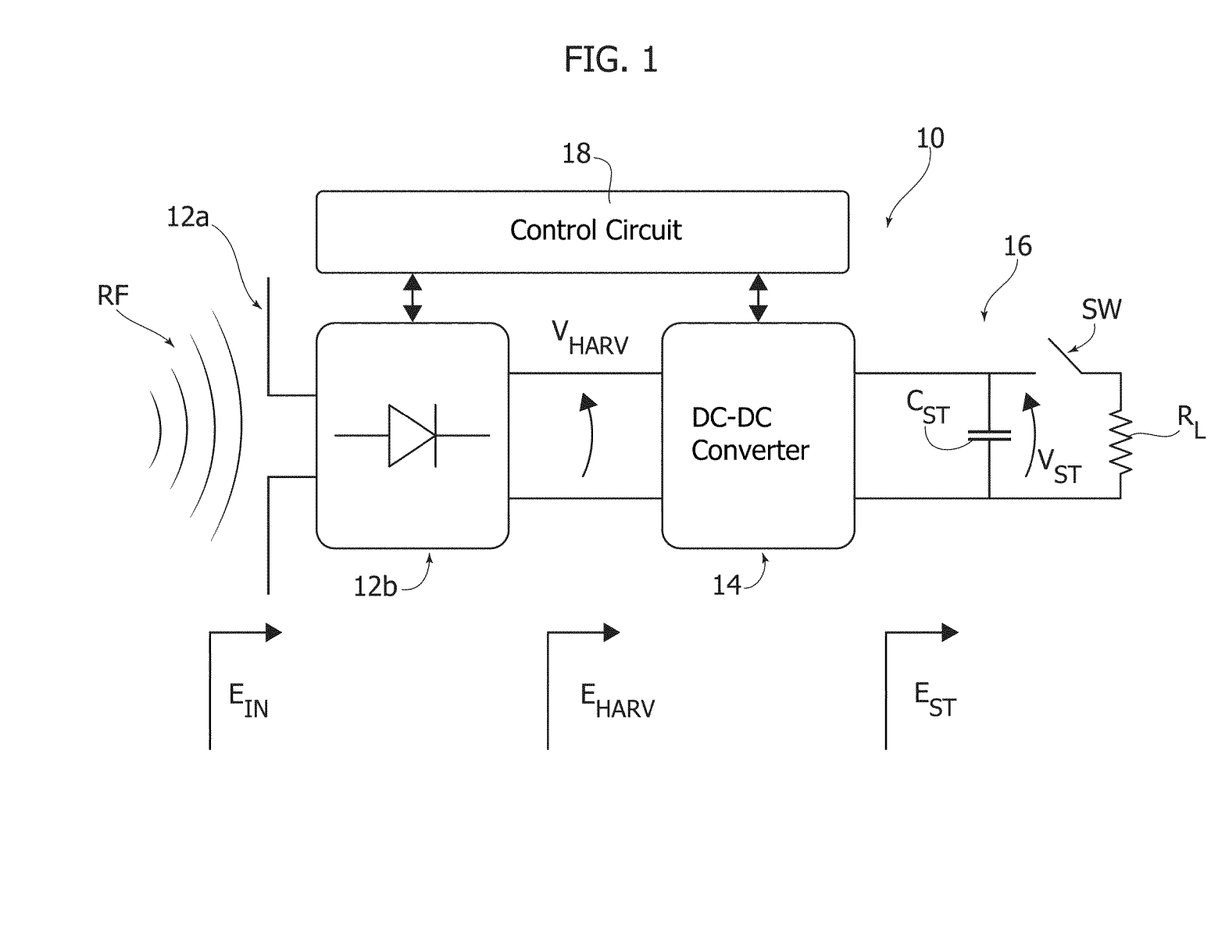
FIG. 1 is a diagram generally exemplary of an RF energy harvester circuit.

The block diagram of FIG. 1 is exemplary of an RF energy harvester arrangement suitable of "harvesting" radio-frequency energy RF via an antenna 12a coupled with a (RF) rectifier 12b, the combination of the antenna 12a and the rectifier 12b being sometimes briefly referred to as "rectenna".

The diagram of FIG. 1 shows a DC-DC (step-up) converter 14 receiving a (voltage) signal $V_{HARV}$ from the rectifier 12b and in turn intended to supply energy towards a storage element 16 (e.g., a low-leakage capacitor $C_{ST}$).

The (RF) energy harvested via the antenna 12a may thus be stored on the storage element $C_{ST}$ with the capability of supplying a load (here generally exemplified as a resistor $R_L$) by applying thereto an output (voltage) signal $V_{ST}$. This may occur, e.g., as a result of the load $R_L$ (which per se may not be a part of the embodiments) being coupled to the circuit 10, e.g., via a switch SW (e.g., a solid-state switch such as a transistor).

In FIG. 1 reference 18 denotes a control circuit (e.g., a low-power C-MOS circuit) configured to control the rectifier 12b and the converter 14 by implementing, e.g., a procedure as discussed in the following in connection with the flow-charts of FIGS. 7 and 8.

In the diagram of FIG. 1 $E_{IN}$, $E_{HARV}$ and $E_{ST}$ indicate:
the energy as harvested by the antenna 12a,
the energy transferred from the rectifier 12b to the converter 14, and
the energy transferred from the converter 14 to the storage element 16, respectively.

Figure 2:
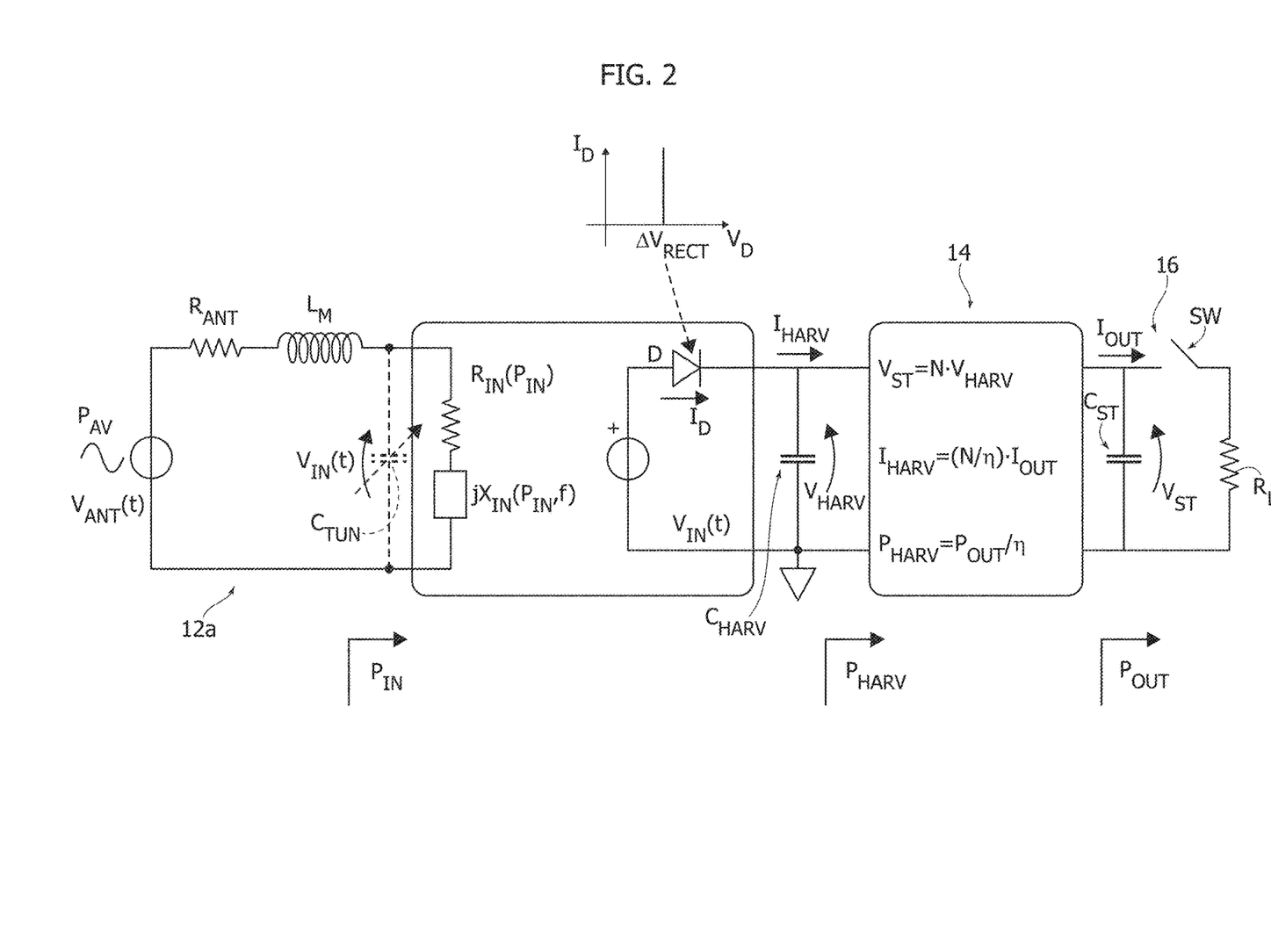
FIG. 2 is a more detailed representation of a harvester device as exemplified in FIG. 1.

FIG. 2 provides an exemplary circuit-level representation of the arrangement of FIG. 1. Consequently, parts or elements like parts or elements already discussed in connection with FIG. 1 are indicated in FIG. 2 with like references/numerals, and a corresponding detailed description will not be repeated for the sake of brevity.

Consistently with $E_{IN}$, $E_{HARV}$ and $E_{ST}$ in FIG. 1, $P_{IN}$, $P_{HARV}$ and $P_{OUT}$ in FIG. 2 indicate the power levels transferred:
from the antenna 12a to the rectifier 12b,
from the rectifier 12b to the converter 14, and
from the converter 14 to the storage element 16, respectively.

As represented in FIG. 2, the following relationships apply $Z_{ANT}=R_{ANT}+j\omega L_M$ $Z_{IN}=R_{IN}+jX_{IN}$ $V_{ANT}(t)=V_{ANT,peak}\sin(\omega t)$ $V_{IN}(t)=V_{IN,peak}\sin(\omega t)$ $V_{HARV}\approx V_{IN,peak}-\Delta V_{RECT}$ $V_{ST}=N\cdot V_{HARV}$ $I_{HARV}=(N/\eta)\cdot I_{OUT}$ $P_{HARV}=V_{HARV}\cdot I_{HARV}=(V_{ST}/N)\cdot(N/\eta)\cdot I_{OUT}=P_{OUT}/\eta$ where:
$Z_{ANT}$=impedance of the antenna 12a (with resistive and inductive components $R_{ANT}$ and $j\omega L_M$, respectively),
$Z_{IN}$=input impedance of the rectifier 12b (with resistive and reactive (capacitive) components $R_{IN}$ and $jX_{IN}$, respectively),
$V_{ANT}(t)$=(voltage) signal generated by the antenna 12a (assumed to be sinusoidal for simplicity),
$V_{IN}(t)$=input (voltage) signal to the rectifier 12b,
$V_{HARV}$=voltage signal provided by the rectifier 12b towards the converter 14 (represented as across the a capacitance $C_{HARV}$ therebetween),
$I_{HARV}$=current signal provided by the rectifier 12b towards the converter 14
$V_{ST}$=(voltage) signal available at the output of the storage element 16 (e.g., across the capacitor $C_{ST}$),
$I_{OUT}$=current adapted to be supplied to the load $R_L$,
$P_{OUT}$=power adapted to be supplied to the load $R_L$.
N=step-up factor of the DC-DC converter
η=efficiency of the converter 14

The rectifier 12b may exhibit a threshold loss $\Delta V_{RECT}$ with a resistance value $R_{RECT}$ adapted to model power losses in the rectifier causing a power efficiency (η) lower than 100%.

The presence of the converter 14 (e.g., DC-DC) facilitates charging the storage element (e.g., capacitor $C_{ST}$), at a "useful" voltage level (e.g., 1.5-2.5V).

The converter 14 can be designed ("optimized") for operation at (very) low-input power levels (in the range of μW).

Figure 3:
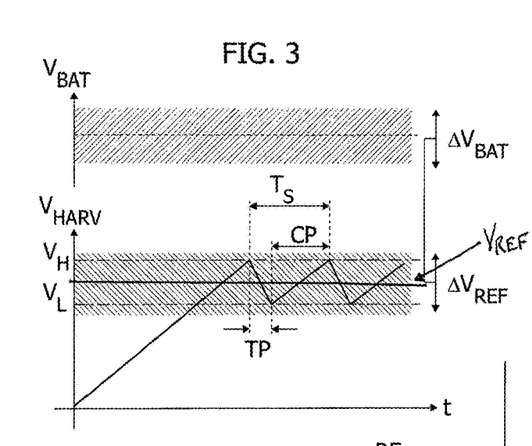
FIG. 3 is exemplary of possible operation of the DC-DC converter in the RF energy harvester circuit as exemplified in FIGS. 1 and 2.
Figure 4:
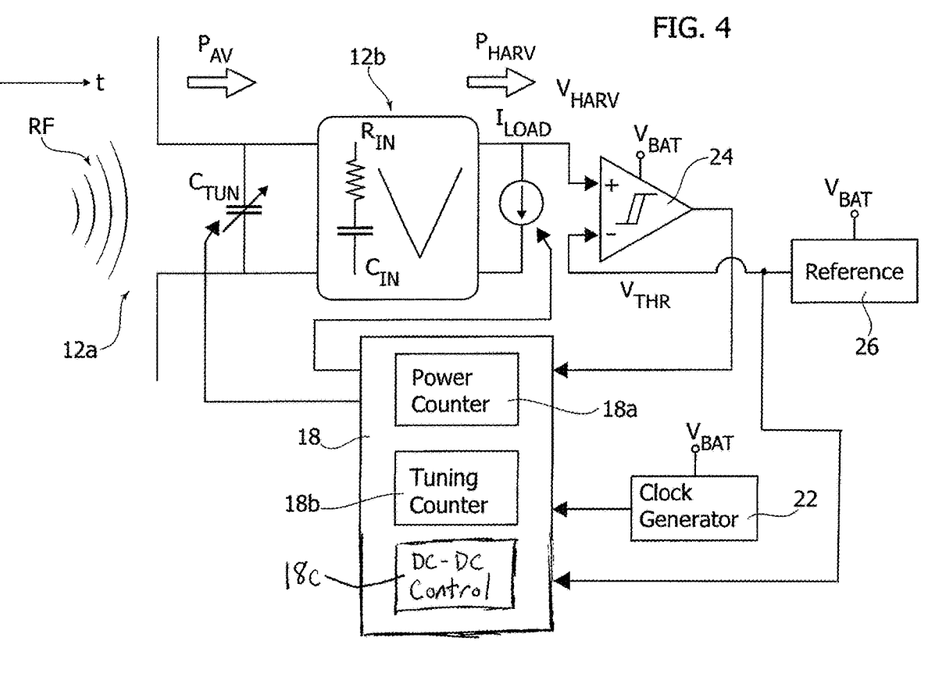
FIGS. 4 and 5 are circuit diagrams exemplary of embodiments of the present disclosure.
Figure 9:
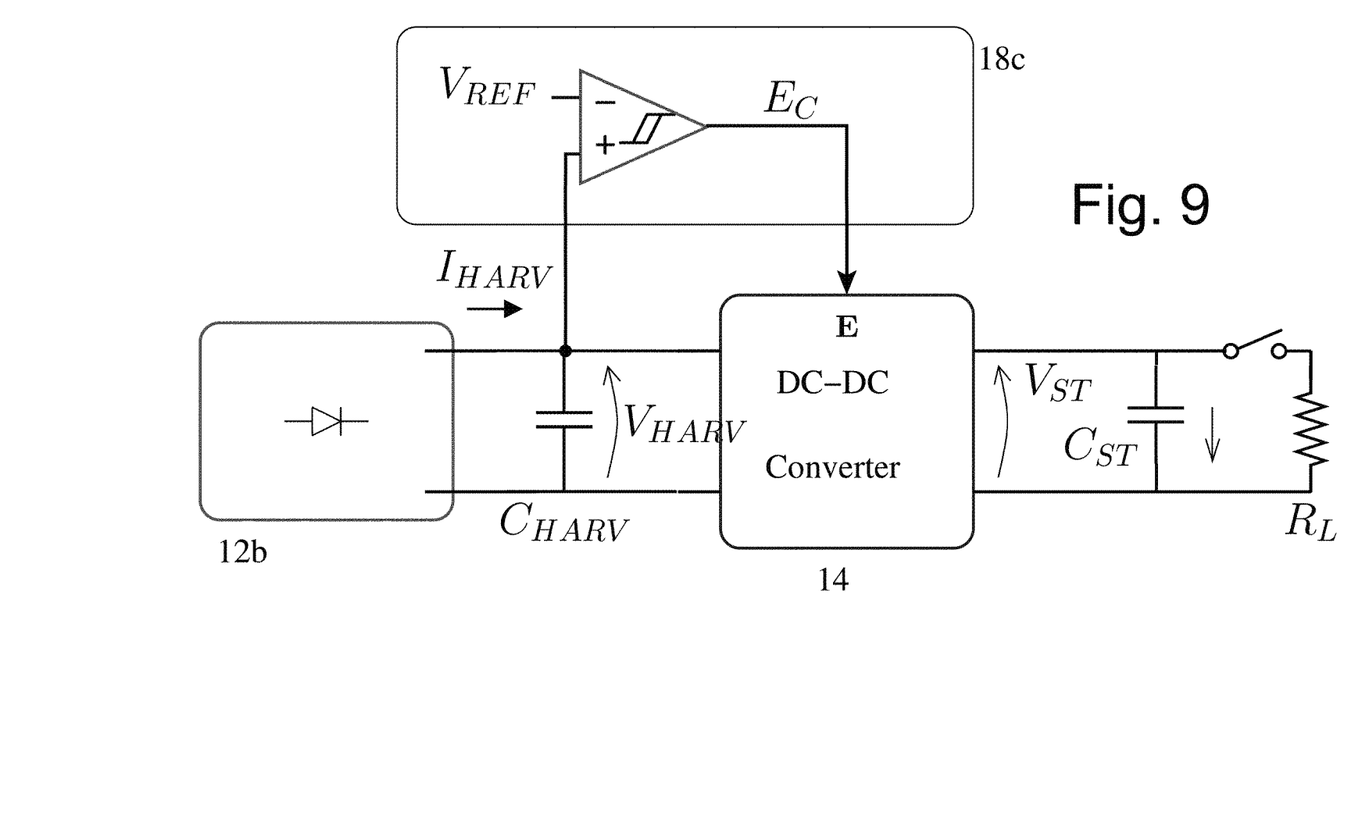
FIG. 9 is a circuit diagram showing control of the DC-DC converter of FIGS. 1 and 2 according to an embodiment of the present disclosure.

The diagram of FIG. 3 is exemplary of possible operation of the converter 14 (as controlled, e.g., by the circuit block 18) involving—in a manner known per se—discontinuous mode operation depending upon the power $P_{HARV}$, i.e. the power available at the output of the rectifier when its output voltage $V_{HARV}$ is equal to the average value of $V_H$ and $V_L$, named $V_{REF}$ in FIG. 3 and equal to $V_{THR}$ in FIG. 4. In operation, the DC-DC converter 14 is disconnected from the rectenna during time interval CP and the DC-DC converter is connected to the rectenna during time interval TP shown in FIG. 3. FIG. 3 shows the behavior of $V_{HARV}$ (ordinate scale) over time (abscissa scale) with also a voltage $V_{BAT}$ shown, when the DC-DC converter is controlled as shown in FIG. 9, by the comparator 18-c with $V_{REF}$ equal to $V_{THR}$.

The voltage $V_{BAT}$ (repeatedly referred to in the following) is generally representative of a supply voltage made available to various circuits as exemplified herein.

This may be provided, e.g., by a battery (e.g., a rechargeable battery coupled to the storage element 16 such as the capacitor $C_{ST}$) or, in the case of "battery-less" solutions by the storage element 16.

As a result of $V_{HARV}$ reaching an upper threshold $V_H$, the converter 14 is activated, so that energy can be transferred from the output of the rectifier 12b (as exemplified by the capacitor $C_{HARV}$ in FIG. 2) to the storage element 16 (e.g., the capacitor $C_{ST}$).

It is observed that, if the voltage output of the converter (open-load condition) is higher than $V_{BAT}$ and if the capacitor $C_{ST}$ is very large (μF), $C_{ST}$ practically behaves as a short circuit for the converter.

As a result of $V_{HARV}$ reaching a lower threshold $V_L$ (due to energy transfer from $C_{HARV}$ to $C_{ST}$) the converter 14 is switched off.

With the DC-DC control described in FIGS. 3 and 9, the average input voltage the converter, i.e., the output voltage of the rectifier $V_{HARV}$, is maintained equal to $V_{REF}$.

Stated otherwise, this kind of operation provides for activating the converter 14 (only) if a positive net energy transfer can be obtained through the converter 14 (so that the charge available across $C_{ST}$ is desirably increased—or at least preserved—and not reduced as a result of converter operation 14).

One or more embodiments may be based on the recognition of various factors related to operation of an arrangement as exemplified in FIGS. 1 and 2.

For instance, the (equivalent) input impedance $Z_{IN}$ is dependent on $P_{IN}$ with $R_{IN}$ (the resistive components thereof) exhibiting a positive derivative with respect to $P_{IN}$ (by neglecting a dependence on f over a mid-narrow bandwidth). Also $X_{IN}$ exhibits a slight dependence on $P_{IN}$, while, over a frequency band of interest $X_{IN}$ may exhibit a capacitive-type dependence on f.

Also, for a given value of $P_{AV}$ (power available at the antenna 12a), $P_{IN}$ depends on $P_{HARV}$ and on the actual value of $V_{HARV}$.

Also, impedance matching between the antenna 12a and input of the rectifier 12b facilitates (maximum) power transfer with the resonance frequency $f_C$ and the quality factor Q of the "rectenna" arrangement 12a, 12b playing a role insofar as an increase in the quality factor Q translates into a higher amplitude of $V_{IN}$ (for a given $P_{AV}$) with a peak value for Q (e.g., $Q_P$) occurring at power matching conditions.

A high value for $Q_P$ translates into a correspondingly smaller bandwidth so that if the "rectenna" is detuned a corresponding reduction occurs in input power.

Consequently, input matching and the quality factor represent significant parameters for the circuit 12a, 12b.

It is otherwise observed that in the case of de-tuning a lower value for $Q_P$ facilitates achieving a higher value for $P_{IN}$ (for a given $P_{AV}$).

Also, operation of the rectifier 12b was found to be facilitated by an input voltage ($V_{IN-p}$) higher than a lower threshold value with a higher value for $Q_{peak}$ resulting in a correspondingly higher peak value for $V_{IN-p}$, namely $V_{IN-peak}$, so that the benefit of a higher Q is almost completely lost if de-tuning occurs.

For instance, in the case of a full-wave rectifier with $V_T$ compensation (as disclosed, e.g., in Nakamoto, H., at al.: "A passive UHF RF Identification CMOS Tag IC using Ferroelectric RAM in 0.35-pm Technology", IEEE JOURNAL OF SOLID-STATE CIRCUITS, vol. 42, no. 1, 1 Jan. 2007, pages 101-110) both the capacitive and the resistive components of the rectifier input impedance ($C_{IN}$ and $R_{IN}$, respectively) were found to exhibit a dependence on $P_{HARV}$, therefore on $P_{IN}$.

One or more embodiments may be based on the recognition that "tuning" the antenna 12a (as exemplified by a "tuning" capacitor $C_{TUN}$ shown in dashed line in FIG. 2 and in full line in FIG. 4) may facilitate translating the Q(f)—that is Q as a function of the frequency f—from a generic point to a matched condition as desired.

In that respect, it was noted that a resistance mismatch between $R_{IN}$ and $R_{ANT}$ ends up by having a lower impact on $P_{IN}$ than a mismatch of the corresponding reactive components (e.g., for a relatively high $Q_p$).

Also, it is observed that if the available power is not sufficient to turn on the converter 14 in order to permit a transfer of energy towards the storage element 16, the converter 14 may be kept in an off state as discussed previously in connection with the FIG. 3.

It is otherwise noted that the input impedance of the rectifier 12b depends (as discussed previously) on the power delivered towards the converter 14. This may be the case for $R_{IN}$ which may be (markedly) dependent on the DC-DC operating conditions, while $C_{IN}$ was found to be more weakly dependent thereon.

Finally, it is observed that achieving an effective tuning as desired is facilitated if implemented with the effective, actual load at the output of the rectifier 12b. Antenna auto-tuning may thus be compatible with discontinuous operation of the converter 14 as exemplified previously in connection with Figure. It is worth noting that during the auto-tuning operation, the DC-DC converter is switched off and disconnected from the rectifier. The antenna auto tuning described in FIG. 4 guarantees that the delivered power $P_{HARV}$ is measured at the same output voltage $V_{HARV}$ occurring when the DC-DC converter is connected to the rectifier and operating as in FIG. 3. As discussed previously, an RF input signal contemplated for harvesting with one or more embodiments can be approximated as a multi-tone signal.

Consequently, a sort of global maximum search (that is, scanning the "environment" RF bandwidth to find out (at least) one frequency band or tone providing a highest level of RF power available may be a viable strategy.

FIG. 4 is exemplary of a possible arrangement adapted to perform a tuning action of the antenna by acting on the capacitor $C_{TUN}$ as already introduced in connection with FIG. 2. As exemplified herein (and merely for the sake of explanation) the capacitor $C_{TUN}$ can be regarded as arranged across the input nodes of the rectifier 12b.

In one or more embodiments, tuning of the capacitor $C_{TUN}$ (e.g., as discussed in the following in connection with FIGS. 4 and 5) may be controlled—as discussed in the following—via counter circuits 18a (power counter) and 18b (tuning counter) clocked via a clock generator 22 in cooperation with a comparator 24 sensitive to the difference between the rectifier output signal $V_{HARV}$ and a reference threshold $V_{THR}$ set by a reference generator 26.

In one or more embodiments these circuit elements may be fed via the (voltage) signal $V_{BAT}$ and be (at least in part) included/implemented (in HW and/or SW form) in the control circuitry 18 of FIG. 1.

For the sake of simplicity, FIG. 4 (wherein parts/elements/entities like parts/elements/entities discussed in connection with the previous figures are indicated with like references/numerals thus making it unnecessary to repeat a corresponding description) focuses on tuning operation of the "rectenna" 12a, 12b. It will be otherwise understood that, in current operation of the circuit 10, the output from the rectifier 12b (e.g., $V_{HARV}$) is intended to be supplied towards the harvester circuit output (e.g., towards the converter 14 and on towards the load $R_L$ under the control of the switch SW) as exemplified previously.

An arrangement as exemplified in FIG. 4 may implement a sort of peak-power-based tuning procedure wherein the "environment" frequency spectrum is scanned so that the available RF frequency bands are scanned, e.g., from an upper value $f_{MAX}$ to a lower value $f_{MIN}$. As noted, one or more embodiments may involve possibly skipping certain frequency bands/tones and/or checking only a limited set of bands/tones as discussed previously.

Figure 5:
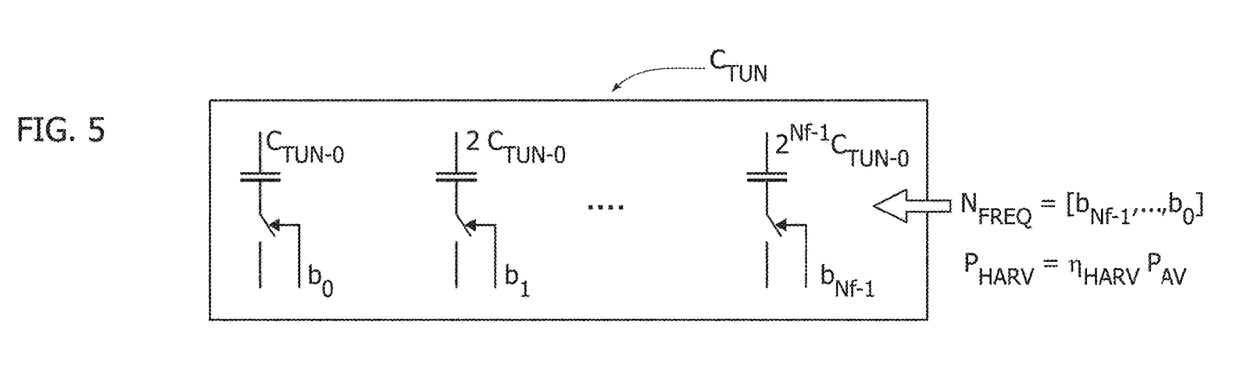

One or more embodiments may involve implementing the tuning capacitor $C_{TUN}$ by means of a bank of capacitors as exemplified in FIG. 5 (e.g., $C_{TUN-0}$, $2C_{TUN-0}$, ..., $2^{Nf-1}C_{TUN-0}$) selectively activated (as schematically represented by switches, e.g., transistors in FIG. 5) with activation of the capacitors/switches taking place as a function of control bits ($b_0, b_1, \ldots, b_{Nf-1}$) provided by the tuning counter 18b in FIG. 4.

In one or more embodiments, for each tuning frequency, the load current $I_{LOAD}$ at the output of the rectifier 12b is progressively increased from, e.g., $I_{LOAD,MIN}$ to $I_{LOAD,MAX}$, that is between a lower and an upper value. Such a control of the current $I_{LOAD}$ at the output of the rectifier 12b may occur in digital form under the control of the power counter 18a.

In one or more embodiments, increasing (e.g., by steps) $I_{LOAD}$ can be stopped when $V_{HARV}$ falls below $V_{THR}$, as detected by the comparator 24, with the last values for $I_{LOAD}$ and $V_{THR}$ providing an estimation of the available power (at the output of the rectifier 12b) at a value of $V_{HARV}$ equal to the threshold voltage $V_{THR}$.

In that way, the peak power available at the output of the rectifier 12b can be estimated for each value of the (center of the) frequency band (tone) currently scanned by increasing the output of the tuning counter 18b controlling the capacitor bank as exemplified in FIG. 5.

In that way the (center) frequency (corresponding to a certain configuration of the capacitor bank, namely a certain string of control bits as exemplified in FIG. 5 assuming respective "0" and "1" values) can be selected as the "tuning" frequency providing a desired (highest) available level of RF power (corresponding to a sort of "optimum" tuning frequency).

One or more embodiments as exemplified in FIGS. 4 and 5 thus make it possible to tune the "rectenna" arrangement 12a, 12b, at a peak power level as measured at the output of the rectifier 12b.

It is observed that, while per se adapted to be performed "upwardly" from a lower frequency towards a higher value, a scanning process may be performed "downwardly" as exemplified herein, namely starting from a highest frequency $f_{MAX}$ towards a lowest frequency value $f_{MIN}$.

Figure 6:
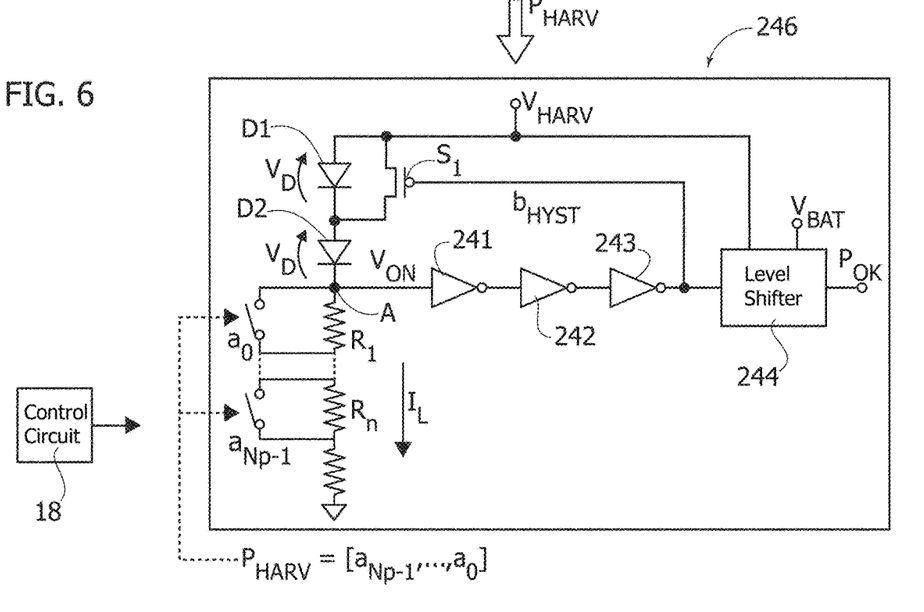
FIG. 6 is another circuit diagram exemplary of possible features of embodiments of the present disclosure.

The circuit diagram of FIG. 6 is exemplary of a possible arrangement wherein the reference block 26 for the generation of $V_{THR}$ may be dispensed with (with a consequent advantage in terms of power saving) and the comparator 24 replaced by three inverter logic gates 241, 242, 243.

In an arrangement as exemplified in FIG. 6, a circuit 246 is included in a current line between $V_{HARV}$ (the output voltage from the rectifier 12b) and ground so that a current $I_L$ (namely the load current $I_{LOAD}$, intended to be progressively increased) flows through a series arrangement of resistors $R_1, R_2, \ldots, R_n$ between a node A and ground, with the node A coupled to an input node at a voltage $V_{HARV}$ via two cascaded p-n junctions (e.g., diodes) D1, D2 arranged with their cathodes towards the node A. A switch, e.g., a MOSFET transistor $S_1$ coupled across the terminals (anode-cathode) of one of the diodes D1, D2 (e.g., D1, set between D2 and $V_{HARV}$), provides a hysteresis behavior as discussed in the following.

The node A is coupled to the input of a first inverter 241 in a cascaded arrangements of inverters 241, 242, 243 with the output from the last inverter 243 which drives the control terminal (gate, in the exemplary case of a field effect transistor such as a MOSFET) of the transistor S1.

The resistors $R_1, \ldots, R_n$ are adapted to be shorted by respective switches (e.g., solid-state switches such as transistors) activatable as a function of bit values $a_0, \ldots, a_{Np-1}$.

The output from the last inverter 243 is also coupled to the input of a level shifter 244 sensitive to the voltage $V_{HARV}$ and outputting a "measurement" signal at a node $P_{OK}$ (e.g., towards the control circuit block 18) and supplied by the voltage $V_{BAT}$.

The load current $I_{load}$ drawn by the cascaded resistors $R_1, \ldots, R_n$ can be selectively varied (e.g., gradually increased for each frequency in the scanning procedure discussed previously) by changing the value of the resistance between the node A (at a value $V_{HARV}$ minus the voltage drop $V_D$ across the diodes D1, D2, as discussed in the following) and ground by varying the values $a_0, \ldots, a_{Np-1}$ (which may occur under the control of the power counter 18a).

It will be appreciated that, in one more embodiments, the circuit elements D1, D2 exemplified in FIG. 6 as p-n junction diodes can be implemented in various other ways known to those of skill in the art, e.g., as transistors in a diode connection (MOSFET transistors with gate shorted to drain) biased in a weak inversion region or as metal-silicon (Schottky) diodes.

The input of the first inverter 241 ($V_{ON}$ at node A) can be expressed as $V_{ON}=V_{HARV}-(1+b_{HYST}) \cdot V_D$ with $b_{HYST}$ belonging to the range [0, 1] (e.g., selected out of 0 and 1) where $V_D$ is the voltage drop across the diodes indicated with the same designation.

The threshold for $V_{HARV}$ ($V_{THR}$) is thus the threshold of the first inverter while comparator hysteresis is implemented by means of $b_{HYST}$ and the switch $S_1$ (controlled by the output of the inverter 243, that is, by a delayed replica of the output from the first inverter 241 sensitive to $V_{ON}$) made selectively:
  conductive, to short-circuit the diode D1 ($b_{HYST}=0$),
  non-conductive, so that the diode D1 is coupled between $V_{HARV}$ and D2 ($b_{HYST}=1$).

A level shifter 244 may facilitate providing the output logical signal $P_{OK}$ to a logic domain under $V_{BAT}$.

In one or more embodiments as exemplified herein, the output logical signal $P_{OK}$ is indicative of the point where (as discussed previously) increasing $I_{LOAD}$ may be stopped as result of $V_{HARV}$ falling below a certain threshold $V_{THR}$ with the values for $I_{LOAD}$ and $V_{THR}$ leading to such a voltage drop providing an estimation of the available power (at the output of the rectifier 12b), e.g., at a certain threshold $V_{THR}$.

For instance, the circuit exemplified in FIG. 6 may implement processing steps aiming at estimating the instantaneous power $P_{HARV}$ provided by the "rectenna" 12a, 12b via a sequence of iterative actions wherein a known (resistive) load is applied to the rectifier 12b by evaluating if the "measurement" voltage P_OK at the node $P_{OK}$ is "true" or "false".

In one or more embodiments, during measurement/evaluation operation, the converter 14 (and/or other "user" circuitry) is turned off to facilitate a condition where the (only) load current of the rectifier (e.g., $I_{HARV}$ in FIG. 2) is due to the circuit 246 in FIG. 6 (e.g., $I_L$, at least approximately).

By way of (non-limiting) example, one may consider an arrangement as exemplified in FIG. 6 with a resistive load including ten resistors (that is, $R_1, \ldots, R_n$ with n=10) of equal resistance values (e.g., R=25 kOhm) and a threshold value V_THRESHOLD of the digital gate 241 (i.e., inverter gate).

For instance, if the element 241 is implemented as a CMOS inverter, V_THRESHOLD depends on its supply voltage (i.e., $V_{HARV}$), i.e., V_THRESHOLD=$V_{HARV}$*k_INV, where k_INV is a coefficient depending on the aspect ratio of the PMOS and NMOS devices within the CMOS inverter.

One may reasonably assume that the voltage $V_{HARV}$ will cause a current having an intensity I_RESISTOR=$V_{ON}$/R_T to flow in the load resistors $R_1, \ldots, R_{10}$, where $V_{ON}$ indicates the voltage at the node A and R_T is the effective resistance of resistors R1, . . . , Rn (e.g., with n=10) combined (e.g., in series) via the switches $a_0, \ldots, a_{Np-1}$.

Under these conditions, the (first) inverter 241 coupled to the node A will act as a 1-bit analog-to-digital converter (essentially as a comparator with a threshold V_THRESHOLD) with switching of the associates logic gate taking place as a result of $V_{ON} \geq$ V_THRESHOLD.

In the exemplary case discussed herein, since $V_{ON}=V_{HARV}-V_D$ (with S1 ON, $b_{HYST}$=0) and V_THRESHOLD=$V_{HARV}$*k_INV, switching of the inverter gate 241 will occur at $V_{HARV}=V_D/(1-$k_INV$)$.

The power provided by the RF rectifier 12b, and thus the power P_HARVESTER available (e.g., at a certain frequency band), can be thus be evaluated by step-wise (e.g., STEP_1, STEP_2, . . . ) reducing the load applied thereto, with the power adapted to be expressed as ($V_{ON}$/R_T) $V_{HARV}=V_{HARV}^2$/R_T$-(V_{HARV}*V_D*(1+b_{HYST}))$/R_T.

In an arrangement as exemplified in FIG. 6, this may occur by gradually reducing the resistive load between the node A and ground by progressively short-circuiting via the switches $a_0, \ldots, a_{Np-1}$, an increased number of resistors $R_1, \ldots, R_{10}$ in the series arrangement between the node A and ground and correspondingly checking the output of logic gate 241 (and of the level-shifter 244, $P_{OK}$).

In the example discussed herein, one may reasonably assume that the power consumption on the diode(s) D2 (and D1) is negligible, i.e., P_HARVESTER~$V_{HARV}^2$/R, k_INV=0.5, $V_D$=0.5V.

Therefore V_THRESHOLD=0.5 V (at $V_{HARV}$=1V) and $P_{OK}$ toggles from 1 to 0 (assuming inverting level shifter LS 244) when $V_{HARV}$ falls below 1V.

The following is an example of steps wherein an increasing number of resistors $R_1$ is progressively (e.g., step-wise) short-circuited via the switches $a_0, \ldots, a_{Np-1}$.

STEP1: R_T=10R, $V_{HARV}$>2*$V_D$=1V
P_OK=1 (inverting LS)
P_HARVESTER_STEP_1≥(V_THRESHOLD^2)/10R≥1 uW
STEP2: R_T=9R, $V_{HARV}$>2*$V_D$=1V
P_OK=1 (inverting LS)
P_HARVESTER_STEP_2≥(V_THRESHOLD^2)/9R≥1.1 uW
. . .
STEP8: R_T=3R, $V_{HARV}$>2*$V_D$=1V
P_OK=1 (inverting LS)
P_HARVESTER_STEP_8≥(V_THRESHOLD^2)/3R≥3.3 uW
STEP9: R_T=2R, $V_{HARV}$<2*$V_D$=1V
P_OK=0 (inverting LS)
P_HARVESTER_STEP_9<=(V_THRESHOLD^2)/2R<=5 uW Referring to P_OK at the node $P_{OK}$ switching from P_OK=1 to P_OK=0 may be representative of an exemplary case where, upon reaching step 9, the power provided by the rectifier 12b is no longer in a position to provide a voltage $V_{ON}$ high enough to keep P_OK at a "high" logic value, e.g., to provide a rectified voltage $V_{HARV}$>2*$V_D$=1V.

As a result, it may be—at least approximately—evaluated that the (highest) power the rectifier 12b (that is, the rectenna 12a, 12b) is capable of providing in a certain frequency band lies between 3.3 uW and 5 uW at $V_{HARV}$=1V.

Of course referring to P_OK switching, e.g., from P_OK=1 to P_OK=0 upon reaching step 9 is merely exemplary insofar as this switching may occur at (notionally) each step in the procedure described.

The power provided by the rectifier 12b (that is, the power captured by the rectenna 12a, 12b) at a certain frequency band may thus be estimated to be higher (resp. lower) than the power provided/captured at another frequency band based on the number of steps which led to P_OK switching being higher (resp. lower) in the former case than in the latter case.

In the (purely exemplary) case discussed herein, all the resistors $R_1, \ldots, R_n$ are assumed to be of equal value. In one or more embodiments, different resistance values can be used to obtain, e.g., a power evaluation on a linear scale in the place of a logarithmic one.

Figures 7, 8:
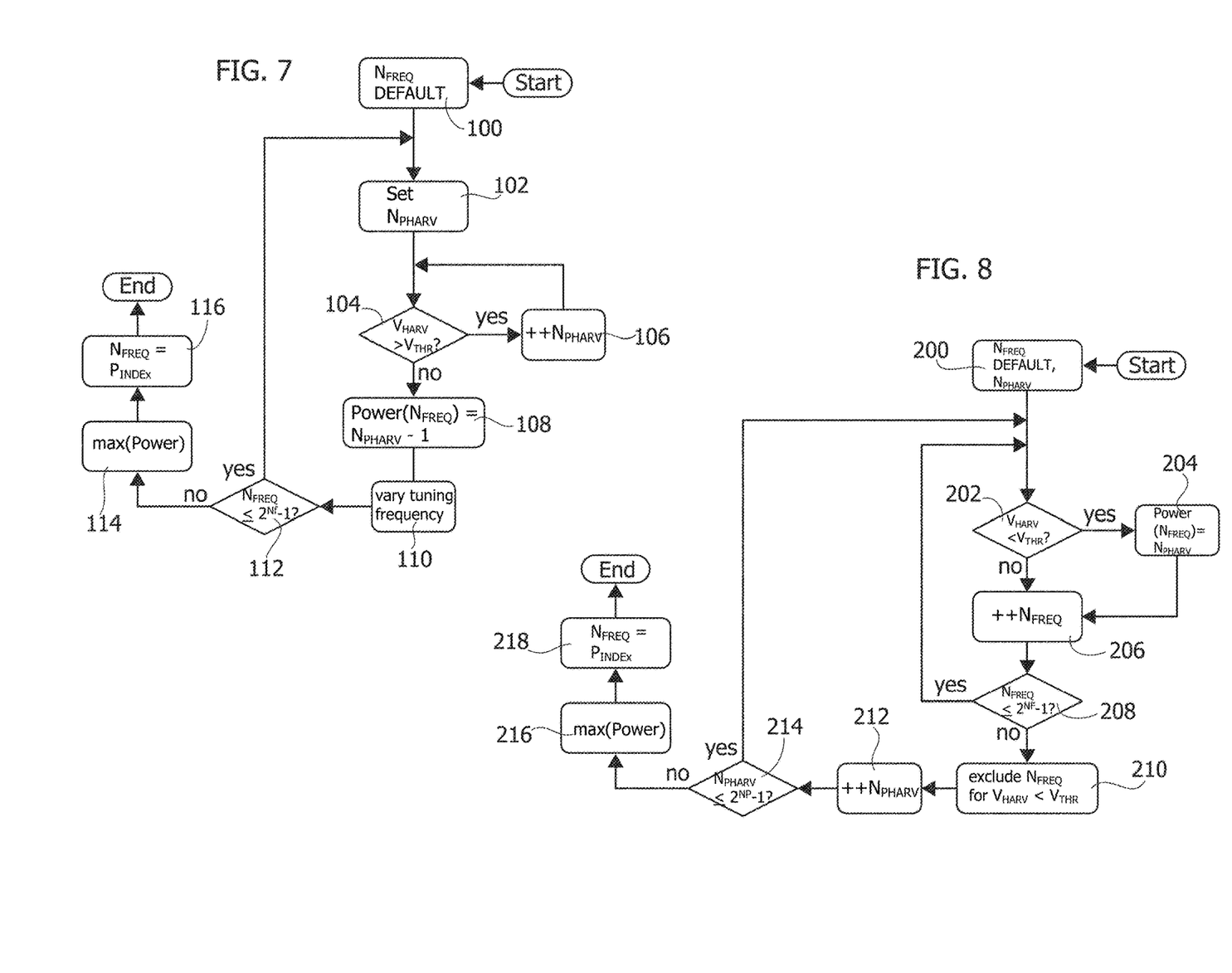
FIGS. 7 and 8 are flowcharts exemplary of the possible operation of embodiments of the present disclosure.

One or more embodiments as exemplified herein make it possible to store—rather than the estimated power per se—a value (e.g., an index $N_{PHARV}$ as referred to in discussing the flowcharts of FIGS. 7 and 8) which is representative of the configuration of the "active", non-shorted resistors $R_1, \ldots, R_n$ (or, conversely, of the "non-active", shorted resistors $R_1, \ldots, R_n$) which resulted in a drop of the harvesting voltage, as detected by the voltage $V_{ON}$ reaching the threshold V_THRESHOLD.

In that way, one or more embodiments make it possible to sense respective values (such as, e.g., Power $(N_{FREQ})=N_{PHARV}-1$) indicative of the power of radiofrequency signals captured by the antenna unit 12a, 12b at certain frequency bands in the plurality of tuning bands subject to scanning.

As noted, an index indicative of, e.g., how many resistors were shorted in order to cause $V_{ON}$ to drop down to the threshold V_THRESHOLD and cause P_OK to switch, e.g., from P_OK=1 to P_OK=0 may be indicative of the power of radiofrequency signals captured by the antenna unit 12a, 12b at a certain frequency band.

One or more embodiments thus make it possible to identify—e.g., as a function of respective values for the index discussed previously, that is without having to store and compare values for the power levels captured by the antenna unit—(at least) one of the frequency bands scanned where a highest power of radiofrequency signals is captured by the antenna unit (rectenna).

For instance (with reference to the exemplary case discussed above in connection with FIG. 6) this may be the one frequency band for which a highest number of resistors $R_1, \ldots, R_n$ were shorted in order to cause $V_{ON}$ to drop down to the threshold and cause P_OK to switch, e.g., from P_OK=1 to P_OK=0.

In one or more embodiments, the harvester circuit 10 can thus be operated with the antenna unit 12a, 12b tuned at the frequency band thus identified.

In the case of two (or more) frequency bands being identified, one can be selected, e.g., in a pseudo-random manner.

Also, since the characteristics of the converter 14 are known, the state machine is in a position to decide whether the converter (and/or, other user circuitry) can be turned on (again) once the power estimation procedure discussed is completed.

The flowcharts of FIGS. 7 and 8 are exemplary of two possible approaches in performing the peak-power based tuning procedure as discussed in the foregoing.

The flowchart of FIG. 7 is exemplary of a "sweep load first" approach, whereas the flowchart of FIG. 8 is exemplary of a "sweep frequency first" approach.

In FIG. 7, after a START step, in a step or act 100 a frequency $N_{FREQ}$ is set to a default value $N_{FREQ.DEFAULT}$ (e.g., a value $f_{MAX}$, which may occur by acting on the coefficients $b_0, b_1, \ldots, b_{Nf-1}$) while the power level is set to a virtually "zero" value, e.g., in the power counter 18a, possibly by acting on the coefficients $a_0, \ldots, a_{Np-1}$ in FIG. 6 in those embodiments adopting an implementation as exemplified therein.

The blocks 102 to 112 in FIG. 7 are exemplary of an "inner loop" on the harvester load, with, e.g., a level $N_{PHARV}$ set first to zero (e.g., $N_{PHARV}=0$) in an act 102 followed by a check in an act 104 as to whether $V_{HARV}$ is higher than $V_{THR}$ (see, e.g., the comparator 24 in FIG. 4 or the corresponding arrangement in FIG. 6) and whether all the contemplated steps for $N_{PHARV}$ have been completed (namely $N_{PHARV} \leq 2^{NP}-1$).

A positive outcome of the check in act 104 leads to an increase in $N_{PHARV}$ (++$N_{PHARV}$) in an act 106 with operation returning upstream of the check 104 to implement a harvester load loop ($P_{HARV}$ loop).

A negative outcome of the check in act 104 leads (in an act 108) to the value of a highest available power for each frequency band (e.g., with a corresponding index, e.g., Power($N_{FREQ}$)=$N_{PHARV}-1$) being stored (e.g., in the circuit block 18).

The act 108 is followed by an act 110 wherein the tuning frequency is varied (e.g., decreased or increased) according to the frequency scanning plan adopted.

As noted, in one or more embodiments the scanning process may involve, e.g., skipping certain frequencies/tones for various reasons, e.g., restricting scanning to certain frequency bands/tones expected to contain energy levels suitable for harvesting.

An act exemplified by block 112 corresponds to a check as to whether the frequency scanning schedule (possibly defined in a selective manner as discussed previously) has been completed.

In the diagram of FIG. 7, a positive outcome of the act 112 (e.g., $N_{FREQ} \leq 2^{Nf-1}$) may be indicative of further frequency bands/tones remaining to be scanned, thus leading the system to return upstream of the act 102.

A negative outcome of the check 112 is indicative of the frequency scanning being completed as planned thus leading to a highest (maximum) power level available, e.g., max (Power) being identified (e.g., via respective indexes [$P_{VAL}$, $P_{INDEx}$]) with a corresponding best frequency band/tone for harvesting purposes identified in an act 116 (e.g., via a corresponding index $N_{FREQ}=P_{INDEx}$) and processing of evolving to an END after a number of iterations $N_{iterations} \leq 2^{NF} \cdot 2^{NP}$.

It will be appreciated that embodiments as exemplified in FIG. 7 lend themselves to adopting practically any desired preset frequency default value (e.g., in act 100) while also facilitating possible non-linear scanning both of load values and of frequency values (that is by adopting non-linear laws for the load and frequency variation steps in acts 106 and 110).

The diagram of FIG. 8 is exemplary of an approach where after a START act, the same actions discussed previously in connection with acts 100 and 102 in FIG. 7 are performed in an act 200 with a frequency scan loop subsequently performed in the acts exemplified by blocks 202 to 208.

For instance, an act 202 may be exemplary of a check made as to whether $V_{HARV}$ is higher than $V_{THR}$ (see, e.g., the comparator 24 of FIG. 4 or the corresponding arrangement of FIG. 6). A positive outcome of the check of act 202 leads to a corresponding power value being stored in an act 204 (e.g., Power ($N_{FREQ}$)=$N_{PHARV}$) followed by a variation in the frequency performed in an act 206 (see for reference also act 112 in FIG. 7).

The act 206 may also be reached directly from the act 202 in the case this latter yields negative outcome.

In an act 208 a check is made as to whether the planned scanning of frequencies (which, again, may be planned selectively, e.g., by skipping certain frequency bands/tones and/or by limiting the scanning to certain frequency bands or tones) has been completed (e.g., $N_{FREQ} \leq 2^{NF}-1$). In the diagram of FIG. 8 a positive outcome of act 208 is indicative of the frequency scan loop still having to be completed, which leads processing to return upstream of act 202.

A negative outcome of the act 208 leads to an act 210 where those frequency values $N_{FREQ}$ for which $V_{HARV}$ was found to be lower than $V_{THR}$ are excluded from further processing (e.g., from further frequency scanning rounds), after which the value for $N_{PHARV}$ (that is, the rectifier load) is increased in an act 212 (see, by way of reference act 106 in FIG. 7).

In an act 214 a check is made as to whether the harvester load loop has been completed or not (e.g., $N_{PHARV} \leq 2^{NP}-1$).

In the flow chart of FIG. 8, a positive outcome of act 214 is indicative of the load loop still having to be completed, which results in processing returning upstream of act 202.

A negative outcome of act 214 is indicative of the completion of the load loop which leads to identifying a highest (maximum) power level available being identified and a corresponding "best" tuning frequency being determined in acts 216 and 218. These may substantially correspond to the acts 114 and 116 in the flow chart of FIG. 7, after which processing evolves to an END.

Again, processing as exemplified in FIG. 8 may be completed in a number of iterations $N_{iterations} \leq 2^{NF \cdot 2NP}$ with the possibility of setting arbitrarily the initial frequency default value and/or the possibility of applying non-linear laws in frequency and load sweeping (acts 206 and 212 in FIG. 8).

One or more embodiments may thus involve a dual-step start-up solution which reduces power consumption and increase the sensitivity of the RF rectifier 12b.

Embodiments as exemplified herein facilitate providing a circuit that for each frequency band/tone may identify an available power level at the output of the RF rectifier with an operative voltage large enough to keep the associated circuitry active ("on state"). Exemplary operating voltages may vary from 0.3 to 0.9 Volt.

At the end of the frequency scan, the antenna 12a can thus be tuned to a "best" sub-frequency band or tone with a highest (maximum) available energy for harvesting.

This in contrast with certain conventional arrangements (see, e.g., U.S. Pat. No. 7,167,090 B1, discussed previously) where only the presence of a voltage is checked. In fact, one or more embodiments may detect (measure) the total available power and activate a converter 14 and/or a separate charge storage circuitry, e.g., as enclosed in an independent power island (only) when the energy balance is positive.

The energy balance being positive corresponds to a condition where the energy from the antenna 12a is enough to operate the circuit so that the RF energy captured can be stored, e.g., in a storage element such as a tank capacitor (e.g., $C_{ST}$ in the figures). A negative energy balance is a condition where (e.g., as a result of a wrong decision) certain circuit elements in the harvester device are switched on with the energy coming from the antenna 12a insufficient to sustain the overall load, so that energy is undesirably sunk from the storage element, e.g., with the capacitor $C_{ST}$ discharged.

One or more embodiments may improve reliability by avoiding, e.g., undesired discharging of a battery (if present) or a tank capacitor.

In one or more embodiments, RF power measurements can be obtained by means of a simple low-power circuit adapted to replace a full-frequency scanner.

In certain embodiments as exemplified, the circuit may include a string of switchable resistors (see, e.g., FIG. 6) that load the RF rectifier output. The resistors are progressively short-circuited until the RF rectifier is no longer capable of sustaining a voltage at its output node ($V_{HARV}$).

The combination of on-off switches that leads to such "automated" voltage drop provides an information about the available input power. While this may not represent, taken per se, quite an accurate measurement of the power available, the associated information is however reliable enough to facilitate evaluations with power measurements made in other frequency bands/tones. In that way the frequency providing a highest (peak) RF energy can be identified.

In one or more embodiments as exemplified in FIG. 6, the hysteresis circuit implemented via the diode D1 and the switch $S_1$ facilitates stabilizing the signal $P_{OK}$ exemplary of a desired "good" power signal by avoiding ringing phenomena such as 0/1/0 ringing. In such embodiments, the signal $P_{OK}$ and the on/off combination of the switches $a_0, \ldots, a_{Np-1}$ are digital signals adapted to be used by a state machine (as possibly included in the circuit block 18) to decide how to proceed.

In those embodiments where a DC-DC converter is present (see, e.g., 14 in the Figures) the possibility exists of keeping it in an "off" state during the associated calibration phase to avoid malfunctions (e.g., undesirably discharging the storage element 16, such as a battery and/or capacitor $C_{ST}$) and/or garbling the decisions of the power measurement unit.

It is noted that the power consumption of the DC-DC converter 14 may turn out to be higher than the RF input power available and/or the power consumption of the power measurement unit. This may be the case, e.g., with a generic power island including digital, analogue or mixed logic circuitry as may be the case with IoT devices like MEMs.

In one or more embodiments, as a result of the (possibly selective) frequency scan operation having been completed with a sufficiently high level of available RF power identified, a state machine (as included, e.g., in the circuit block 18) may switch off the frequency scan circuitry and activate the converter 14. The activation of the converter will have a negligible impact on the resonant frequency of the antenna 12a so the matching condition of the reactive component for the specific resonant frequency band/tone selected may be maintained. This is true if the DC-DC converter is controlled by a reference voltage $V_{REF}$, FIG. 9, equal to the threshold voltage $V_{THR}$, FIG. 4, being used in the auto tuning procedure. This can be obtained by calibrating $V_{REF}$ supplied to comparator 18c by means of the circuit in FIG. 6 or by replacing the comparator 18c with the circuit of FIG. 6.

One or more embodiments may be applied to a wide variety of devices for use, e.g., in logistics, asset tracking (e.g., in manufacturing, storing, shipping and delivering goods), life sciences (medical/health), and various monitoring applications (e.g., in industry or "smart city" applications).

In one or more embodiments, a method of operating a radiofrequency harvester circuit (e.g., 10) including an antenna unit (e.g., a "rectenna" or "rectantenna" 12a, 12b) configured to capture radiofrequency signals and harvesting circuitry (e.g., 14, 16, 18) coupled to the antenna unit, the harvesting circuitry configured to collect radiofrequency energy from the radiofrequency signals captured by the antenna unit, may include:

configuring the antenna unit as a tunable antenna unit (e.g., $C_{TUN}$) selectively tunable (e.g., 18; $b_0, b_1, \ldots, b_{Nf-1}$) at a plurality of tuning bands, scanning the plurality of tuning bands by selectively tuning (e.g., 110; 206) the antenna unit at frequency bands in the plurality of tuning bands, evaluating the power of radiofrequency signals captured by the antenna unit at said frequency bands in the plurality of tuning bands in said scanning, by sensing (e.g., 108; 204) respective values (e.g., $N_{PHARV}$) indicative of the power of radiofrequency signals captured by the antenna unit at said frequency bands in the plurality of tuning bands in said scanning, identifying (e.g., 114; 216), as a function of said respective values, one of said frequency bands wherein a highest power of radiofrequency signals is captured by the antenna unit, and operating (e.g., 116; 218) the harvester circuit with the antenna unit tuned at said one of said frequency bands.

One or more embodiments may include performing said scanning over a frequency range encompassing said plurality of tuning bands by selectively skipping at least one tuning band of said plurality of tuning bands and/or by limiting scanning to a subset of said plurality of tuning bands.

In one or more embodiments, sensing respective values indicative of the power of radiofrequency signals captured by the antenna unit may include:

increasing (e.g., 106; 212; 22, 24, 26; 246; $a_0, a_1, \ldots, a_{NP-1}$) a load applied by the harvesting circuitry to the antenna unit thereby producing a drop in a signal (e.g., $V_{HARV}$, as possibly represented by $V_{ON}$ at node A in FIG. 6) provided by the antenna unit to the harvesting circuitry, sensing a value indicative of the power of radiofrequency signal captured by the antenna unit at (e.g., as a result of detecting) a drop of the signal provided by the antenna unit to the harvesting circuitry to a lower threshold (e.g., $V_{THR}$ as possibly represented by V_THRESHOLD at 241 in FIG. 6).

In one or more embodiments, said scanning may include:
subsequently tuning (e.g., 100, 110) the antenna unit at different frequency bands in the plurality of tuning bands,
increasing (e.g., 102, 106) the load applied by the harvesting circuitry to the antenna unit tuned at each one of the different frequency bands at which the antenna unit is subsequently tuned thereby producing a drop in a signal provided by the antenna unit to the harvesting circuitry.

In one or more embodiments, said scanning may include:
subsequently tuning (e.g., 200, 206) the antenna unit at different frequency bands in the plurality of tuning bands in subsequent frequency scanning rounds (e.g., 202, 204, 206, 208) performed over frequency bands for which the signal provided by the antenna unit to the harvesting circuitry is in excess of said lower threshold,
increasing (e.g., 212) at each scanning round the load applied by the harvesting circuitry to the antenna unit thereby producing a drop in the signal provided by the antenna unit to the harvesting circuitry, wherein frequency bands for which the signal provided by the antenna unit drops to said lower threshold are excluded (e.g., 210) from subsequent scanning rounds.

In one or more embodiments, the harvesting circuitry may include a converter circuit block (e.g., 14) activatable to transfer energy from the antenna unit to an energy storage circuit block (e.g., 16) coupleable (e.g., SW) to an harvester circuit load (e.g., $R_L$), and the method may include operating (e.g., 116; 218) the harvester circuit with the antenna unit tuned at said one of said frequency bands and activating (e.g., TP) resp. de-activating (e.g., CP) the converter circuit block as a result of the signal provided by the antenna unit to the harvesting circuitry reaching a higher (e.g., $V_H$) resp. lower (e.g., $V_L$) operating threshold.

A radiofrequency harvester circuit according to one or more embodiments may include an antenna unit configured to capture radiofrequency signals and harvesting circuitry coupled to the antenna unit, the harvesting circuitry configured to collect energy from the radiofrequency signals captured by the antenna unit, wherein:
the antenna unit includes a tunable antenna unit selectively tunable at a plurality of tuning bands,
a control circuit block is provided coupled to the antenna unit and to the harvesting circuitry, the control circuit block configured to perform the acts of selectively tuning the antenna unit, sensing respective values indicative of the power of radiofrequency signals captured by the antenna unit, identifying said one of said frequency bands, and operating the harvester circuit with the antenna unit tuned at said one of said frequency bands, with the method of one or more embodiments.

A device according to one or more embodiments may include:
a radiofrequency harvester circuit (e.g., 10) according to one or more embodiments,
a harvester circuit load (e.g., $R_L$), and
a coupling circuitry (e.g., SW) activatable to couple the harvester circuit load to the harvesting circuitry in the radiofrequency harvester circuit to be supplied thereby.

One or more embodiments may include a Radio Frequency IDentification, RFID, device.

One or more embodiments may include a battery-less device wherein the harvester circuit load is supplied integrally by the radiofrequency harvester circuit.

Without prejudice to the underlying principles, the details and embodiments may vary, even significantly, without departing from the extent of protection.

In embodiments of the present disclosure, a radiofrequency harvester circuit may be used in a battery-less RFID device. The harvester circuit includes an antenna unit that captures radiofrequency signals and harvesting circuitry coupled to the antenna unit for collecting energy from the radiofrequency signals captured by the antenna unit. The antenna unit is selectively tunable at a plurality of tuning bands that are scanned by selectively tuning the antenna unit at different frequency bands and sensing respective values indicative of the power of radiofrequency signals captured by the antenna unit at the frequency bands scanned. A highest value out of said respective values for the power of radiofrequency signals as well as the frequency band in the plurality of tuning bands of the antenna unit providing the aforesaid highest value are identified and the harvester circuit is operated with the antenna unit tuned at the frequency band providing the highest value thus identified. The power point search herein described, namely finding "highest value," is based on the concept that the maximum power $P_{HARV}$ is searched over the frequency band at some value of $V_{HARV} = V_{THR}$ ($V_{THR}$=reference threshold), and varying the tuning capacitance $C_{TUN}$ and the load of the rectifier $I_{LOAD}$. The power $V_{HARV}$ equals the reference threshold $V_{THR}$, where $V_{THR} = V_{REF}$ in FIGS. 3 and 9, the rectifier will deliver to the DC-DC converter the same power that was found/measured during the auto tuning procedure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a radiofrequency harvester circuit, comprising:
scanning a plurality of tuning bands of a selectively tunable antenna unit by selectively tuning the antenna unit at frequency bands in the plurality of tuning bands;
evaluating a power of radiofrequency signals captured by the antenna unit at said frequency bands in the plurality of tuning bands, the evaluating including sensing respective values indicative of the power of radiofrequency signals captured by the antenna unit at said frequency bands in the plurality of tuning bands;
identifying, as a function of said respective values, one of said frequency bands having a highest power of radiofrequency signals captured by the antenna unit; and
operating the radiofrequency harvester circuit with the antenna unit tuned at said one of said frequency bands,
wherein the sensing respective values indicative of the power of radiofrequency signals captured by the antenna unit includes:
applying by the harvesting circuitry a load to the antenna unit, the antenna unit providing a signal to the load;
increasing the load applied by the harvesting circuitry to the antenna unit to produce a drop in the signal provided by the antenna unit to the harvesting circuitry; and sensing a value indicative of the power of radiofrequency signal captured by the antenna unit in response to the signal provided by the antenna unit to the harvesting circuitry reaching a lower threshold.

2. The method of claim 1, wherein scanning the plurality of tuning bands of the selectively tunable antenna unit comprises scanning over a frequency range encompassing said plurality of tuning bands, the scanning over the frequency range encompassing said plurality of tuning bands including at least one of selectively skipping at least one tuning band of said plurality of tuning bands or limiting scanning to a subset of said plurality of tuning bands.

3. The method of claim 1, wherein said scanning comprises:
tuning the antenna unit at different frequency bands in the plurality of tuning bands; and
increasing the load applied by the harvesting circuitry to the antenna unit tuned at each one of the different frequency bands at which the antenna unit is tuned to produce a drop in the signal provided by the antenna unit to the harvesting circuitry.

4. The method of claim 1, wherein said scanning comprises:
tuning the antenna unit at different frequency bands in the plurality of tuning bands in subsequent scanning rounds performed over frequency bands for which the signal provided by the antenna unit to the harvesting circuitry is in excess of said lower threshold; and
increasing at each scanning round the load applied by the harvesting circuitry to the antenna unit to produce a drop in the signal provided by the antenna unit to the harvesting circuitry, wherein frequency bands for which the signal provided by the antenna unit drops to said lower threshold are excluded from subsequent scanning rounds.

5. The method of claim 1, wherein the harvesting circuitry includes a converter circuit block activatable to transfer energy from the antenna unit to an energy storage circuit block, wherein the method further comprises operating the harvester circuit with the antenna unit tuned at said one of said frequency bands and activating the converter circuit block as a result of the signal provided by the antenna unit to the harvesting circuitry reaching a higher operating threshold.

6. The method of claim 5, comprising deactivating the converter circuit block in response to the signal provided by the antenna unit to the harvesting circuitry reaching a lower operating threshold.

7. The method of claim 5, wherein the converter circuit block includes a DC-DC converter.

8. A radiofrequency harvester circuit, comprising:
an antenna unit configured to capture radiofrequency signals and being selectively tunable at a plurality of tuning bands;
harvesting circuitry coupled to the antenna unit, the harvesting circuitry configured to collect energy from the radiofrequency signals captured by the antenna unit, the harvesting circuitry including a rectifier coupled to the antenna unit and a voltage converter coupled to the rectifier, the rectifier configured to generate a harvested voltage from the energy of the radiofrequency signals captured by the antenna; and
a control circuit block coupled to the antenna unit and to the harvesting circuitry, the control circuit block configured to selectively tune the antenna unit, sense respective values indicative of the power of radiofrequency signals captured by the antenna unit, identify one of frequency bands, and operating the harvester circuit with the antenna unit tuned at said identified one of said frequency bands, the control circuit block further configured, in identifying the one of said frequency bands, to:
selectively tune the antenna unit at frequency bands in the plurality of tuning bands of the antenna unit;
sense respective values indicative of a power of radiofrequency signals captured by the antenna unit at said frequency bands in the plurality of tuning bands;
identify as a function of said respective values the one of said frequency bands having a highest power of radiofrequency signals captured by the antenna unit;
activate the voltage converter in response to the harvested voltage reaching an upper voltage threshold; and
deactivate the voltage converter in response to the harvested voltage reaching a lower voltage threshold.

9. The radiofrequency harvester circuit of claim 8, wherein the antenna unit comprises a tunable capacitor.

10. The radiofrequency harvester circuit of claim 9, wherein the tunable capacitor comprises a bank of tuning capacitors.

11. The radiofrequency harvester circuit of claim 10, wherein the control circuit block comprises a tuning counter coupled to the bank of tuning capacitors, the tuning counter configured to generate a plurality of control bits to control a capacitance value of the bank of tuning capacitors.

12. The radiofrequency harvester circuit of claim 8, wherein the plurality of tuning bands of the antenna unit include an upper frequency and a lower frequency, and wherein the control circuit is further configured to selectively skip at least one tuning band of said plurality of tuning bands.

13. The radiofrequency harvester circuit of claim 8, wherein the control circuit block is further configured to sense the respective values indicative of the power of radiofrequency signals captured by the antenna unit, to vary a load on the output of the rectifier and to detect, in response to varying the load, the harvested voltage falling below a reference threshold.

14. The radiofrequency harvester circuit of claim 8, wherein the voltage converter is a DC-DC converter.

15. A device, comprising:
an electromagnetic harvester circuit including:
an antenna configured to capture electromagnetic signals, the antenna selectively tunable at a plurality of tuning bands;
harvesting circuitry coupled to the antenna, the harvesting circuitry configured to collect energy from the electromagnetic signals captured by the antenna and generate a harvested voltage from energy of the electromagnetic signals captured by the antenna, and the harvesting circuitry including a DC-DC converter that is activated and deactivated based on a value of the harvested voltage; and
a control circuit coupled to the antenna and the harvesting circuitry, the control circuit block configured to:
selectively tune the antenna at a frequency selective from among a plurality of tuning frequencies of the antenna;
sense respective values indicative of a power of electromagnetic signals captured by the antenna at the selectively tuned frequencies of the antenna; and identify based on the respective values the one of the tuning frequencies of the antenna that provides captured electromagnetic signals having a highest power;

a load coupled to the harvesting circuitry; and coupling circuitry activatable to couple the load to the harvesting circuitry.

16. The device of claim 15, wherein the electromagnetic harvester circuit comprises a Radio Frequency IDentification (RFID) device.

17. The device of claim 16 wherein the RFID device comprises a battery-less device wherein the load receives power supplied integrally from the harvester circuit.

18. The device of claim 16, wherein the RFID device further comprises a battery coupled to the harvester circuit and configured to be charged using energy captured by the antenna.

19. The device of claim 15, wherein the load comprises a capacitor.

* * * * *

UNITED STATES PATENT AND TRADEMARK OFFICE
CERTIFICATE OF CORRECTION

Page 1 of 1

PATENT NO. : 10,970,497 B2
APPLICATION NO. : 16/280395
DATED : April 6, 2021
INVENTOR(S) : Michele Caselli It is certified that error appears in the above-identified patent and that said Letters Patent is hereby corrected as shown below:

On the Title Page

Item (73), Line 2:
"Agrafe" should be --Agrate--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*